United States Patent
Kitayama et al.

(10) Patent No.: US 6,878,653 B2
(45) Date of Patent: Apr. 12, 2005

(54) ULTRAVIOLET RAY-ABSORBING, COLORLESS AND TRANSPARENT SODA-LIME-SILICA GLASS

(75) Inventors: Masao Kitayama, Hyogo (JP); Yuko Ishizu, Hyogo (JP)

(73) Assignee: Nihon Yamamura Glass Co., Ltd., Nishinomiya (JP)

( * ) Notice: Subject to any disclaimer, the term of this patent is extended or adjusted under 35 U.S.C. 154(b) by 79 days.

(21) Appl. No.: 10/221,552

(22) PCT Filed: Mar. 9, 2001

(86) PCT No.: PCT/JP01/01885

§ 371 (c)(1),
(2), (4) Date: Sep. 13, 2002

(87) PCT Pub. No.: WO01/68545

PCT Pub. Date: Sep. 2, 2001

(65) Prior Publication Data

US 2003/0144126 A1 Jul. 31, 2003

(30) Foreign Application Priority Data

Mar. 14, 2000 (JP) .................... 2000-069864

(51) Int. Cl.⁷ .................... C03C 3/087; C03C 3/095
(52) U.S. Cl. .................... 501/70; 501/64; 501/71; 65/30.11; 65/29.18; 65/134.3
(58) Field of Search .................... 501/64, 70, 71; 65/29.18, 30.11, 134.3

(56) References Cited

U.S. PATENT DOCUMENTS 5,320,986 A    6/1994  Taniguchi et al.

FOREIGN PATENT DOCUMENTS

| EP | 0555552 | 8/1993 |
| JP | 52-47812 | 4/1977 |
| WO | 94/18135 | 8/1994 |
| WO | 00/12441 | 3/2000 |

OTHER PUBLICATIONS

English Language Abstract of JP 52–47812.

*Primary Examiner*—Karl Group
*Assistant Examiner*—Elizabeth A. Bolden
(74) *Attorney, Agent, or Firm*—Greenblum & Bernstein, P.L.C.

(57) ABSTRACT

An ultraviolet ray-absorbing, colorless and transparent soda-lime-silica glass is disclosed, which glass is prepared by irradiating a cerium containing soda-lime-silica glass with light having wavelengths in far- to near-ultraviolet region and thereby reducing transmittance to light with wavelengths in the region of 300–400 nm.

6 Claims, 3 Drawing Sheets

ULTRAVIOLET RAY-ABSORBING, COLORLESS AND TRANSPARENT SODA-LIME-SILICA GLASS

TECHNICAL FIELD

The present invention relates to an ultraviolet ray-absorbing, colorless and transparent soda-lime-silica glass, and to glass bottles made of the glass. In further detail, the present invention relates to an ultraviolet ray-absorbing, colorless and transparent soda-lime-silica glass, and to glass bottles made of the glass, which is free of greenish or bluish tint, yet which can prevent their contents from undergoing ultraviolet ray-induced coloration, discoloration, fading in color or deterioration of the flavor and, inter alia, prevent coloration of refined "sake", coloration or fading in color of wines, and deterioration of the flavor of refined "sake" and wines.

BACKGROUND ART

Amber, green or blue bottles have been widely used for refined "sake" or for beer in order to prevent light-induced coloration, discoloration, fading in color or deterioration of the flavor of their content beverages. Those bottles are all deeply colored and thus prevent their contents from being seen as they are through the bottles. Thus, there have been needs for transparent, colorless, high-brightness glass bottles which thereby allow their contents to be seen more clearly.

In many cases, however, transparent, colorless, high-brightness glass has, at the same time, high transmittance to ultraviolet ray. Ultraviolet ray passing through a glass bottle is apt to induce coloration, discoloration or fading in color of its contents. In the case, inter alia, where refined "sake" is its content, yellowing in its color would entail deterioration of its flavor, thereby greatly impairing its commercial value. In the case of wines, too, there are problems that they would undergo coloration, fading in color and deterioration of the flavor.

As a means to solve these problems, Japanese Patent Application Publication No. S52-47812 discloses an ultraviolet ray-absorbing, colorless soda-lime glass which contains $CeO_2$ and $V_2O_5$ as ultraviolet ray absorbents, and $MnO_2$ or Se and, as needed, $Co_3O_4$ as decolorizing agents. This glass, however, has a substantial risk of undergoing coloration as a result of solarization because of coexisting $CeO_2$ and $V_2O_5$. Japanese Patent No. 2528579 and Japanese Patent Application Publication No. H8-506314 disclose ultraviolet and infrared rays-absorbing glasses containing $Fe_2O_3$, FeO, $CeO_2$ and manganese oxide. However, due to their high total iron content together with their considerable content of FeO, these glasses cannot be free of a green to blue color. This renders those glasses unsatisfactory for use in the production of colorless and transparent, high-brightness bottles that allow their contents to be seen more clearly.

Thus, there have been needs for colorless and transparent, ultraviolet ray-absorbing glass bottles which, while allowing their contents to be seen more clearly on store shelves as a result of their high transmittance to light in the visible region, enable to keep their contents from exposure to ultraviolet ray in the process of distribution and on store shelves.

In order to meat the needs, the present inventors previously found that an ultraviolet ray-absorbing, colorless and transparent soda-lime-silica glass that is highly absorptive of ultraviolet ray while having high transmittance to visible light, is obtained by adding predetermined proportions of $SO_3$, cerium oxide, $Fe_2O_3$, FeO, manganese oxide and, as needed, cobalt oxide to a conventional basic composition of soda-lime-silica glass, and filed on the basis of the findings an international application PCT/JP99/04564 (WO 00/12441). However, there are still needs for glass bottles that allow for further reduction in transmittance to ultraviolet ray, while remaining colorless and transparent.

The objective of the present invention is to provide an ultraviolet ray-absorbing, colorless and transparent soda-lime-silica glass and glass bottles made thereof which, while maintaining high transmittance to light in the visible region and thereby allowing their contents to be seen more clearly, absorb more ultraviolet ray and thereby serve to prevent ultraviolet ray-induced coloration, discoloration, fading in color or deterioration of the flavor of their contents.

DISCLOSURE OF INVENTION

As a result of studies directed to the above objective, the present inventors found that irradiation of a cerium-containing soda-lime-silica glass with light having wavelengths in the far- to near-ultraviolet region gives rise to a glass with reduced transmittance to ultraviolet ray, without affecting the spectral characteristics of the glass in the visible region. The present invention was accomplished based on this finding.

Thus, the present invention provides an ultraviolet ray-absorbing, colorless and transparent soda-lime-silica glass that is obtained by irradiating a cerium-containing soda-lime-silica glass with light having wavelengths in the far- to near-ultraviolet region, thereby causing reduction in transmittance to light with wavelengths in the region of 300–400 nm.

Herein, the phrase "reduction in transmittance to light with wavelengths in the region of 300–400 nm" means general reduction in transmittance to light with wavelengths in the region of 300–400 nm and it is allowed that some minor increase in transmittance be included in a limited part of the region, provided that the gross transmittance in the region of 300–400 nm is reduced when viewed as a whole.

In the ultraviolet ray-absorbing, colorless and transparent soda-lime-silica glass, it is preferable that the reduction in transmittance in the wavelength range of 300–400 nm is given as [transmittance after irradiation/transmittance before irradiation]≦0.9 when assessed employing transmittance to light having the wavelength of 350 nm measured with a 3.5-mm thick sample as an index. More preferably, the value is not more than 0.86.

By using the ultraviolet-ray absorbing, colorless and transparent soda-lime-silica glass of the present invention, it has become possible to further reduce the transmittance to ultraviolet-ray than before, inter alia ultraviolet-ray having wavelengths of 300–350 nm, the light which greatly affects on such contents as refined "sake".

In the specification, "light having wavelengths in the far- to near-ultraviolet region" means ultraviolet-ray having wavelengths in the region of 200–400 nm.

In the above-described ultraviolet-ray absorbing, colorless and transparent soda-lime-silica glass, for reasons mentions later, cerium, as calculated as $CeO_2$, is contained preferably in a proportion of 0.08–0.8% by weight, more preferably in a proportion of 0.10–0.65% by weight, and still more preferably in a proportion of 0.12–0.19% by weight.

The ultraviolet-ray absorbing, colorless and transparent soda-lime-silica glass described above may be provided in the form of a glass bottle.

The ultraviolet-ray absorbing, colorless and transparent soda-lime-silica glass characterized above may be further characterized in that its composition includes, in % by weight,

| | |
|---|---|
| $SO_3$ | 0.14–0.37% |
| Cerium oxide | 0.08–0.8% |
| | (calculated as $CeO_2$) |
| $Fe_2O_3$ | 0.01–0.08% |
| FeO | 0–0.008% |
| Manganese oxide | 0–0.07% |
| | (calculated as MnO) |
| Cobalt oxide | 0–0.0005% |
| | (calculated as CoO). |

Herein, "cerium oxide" means both of $CeO_2$ and $Ce_2O_3$, and its "% by weight" is expressed as a value obtained when all the contained cerium oxide were replaced with $CeO_2$. Likewise, "manganese oxide" means both of MnO and $Mn_2O_3$, and its "% by weight" is expressed as a value obtained when all the contained manganese oxide were replaced with MnO. In addition, "cobalt oxide" is also expressed as a value obtained when all the contained cobalt oxide were replaced with CoO.

The features of the ultraviolet ray-absorbing, colorless and transparent soda-lime-silica glass of the present invention, as mentioned above, consists in irradiation of a cerium-containing soda-lime-silica glass with light having wavelengths in the far- to near-ultraviolet region, and in that the glass preferably contains, in predetermined proportions, $SO_3$, cerium oxide and $Fe_2O_3$ and FeO, and, as needed, manganese oxide and/or cobalt oxide. The basic composition of the soda-lime-silica glass employed may be within conventional ranges. However, considering needs for high chemical durability, eliminated possibility of devitrification and proper easiness of melting, it is preferable that the ultraviolet ray-absorbing, colorless and transparent soda-lime-silica glass of the present invention typically comprises, in % by weight:

| | |
|---|---|
| $SiO_2$ | 65–75% |
| $Al_2O_3$ | 0–5% |
| CaO | 6–15% |
| MgO | 0–4% |
| $Na_2O$ | 10–17% |
| $K_2O$ | 0–4% |
| $SO_3$ | 0.14–0.37% |
| Cerium oxide | 0.08–0.8% |
| | (calculated as $CeO_2$) |
| $Fe_2O_3$ | 0.01–0.08% |
| FeO | 0–0.008% |
| Manganese oxide | 0–0.07% |
| | (calculated as MnO) |
| Cobalt oxide | 0–0.0005% |
| | (calculated as CoO). |

The ultraviolet ray-absorbing, colorless and transparent soda-lime-silica glass of the present invention preferably contains 0.005–0.07% by weight of manganese oxide as calculated as MnO.

In addition, to enhance the reliability of the total performance of the glass of the present invention, it is more preferable that the ultraviolet ray-absorbing, colorless and transparent soda-lime-silica glass of the present invention is characterized in that its composition includes, in % by weight,

| | |
|---|---|
| $SO_3$ | 0.15–0.35% |
| Cerium oxide | 0.10–0.65% |
| | (calculated as $CeO_2$) |
| $Fe_2O_3$ | 0.015–0.06% |
| FeO | 0–0.006% |
| Manganese oxide | 0.007–0.06% |
| | (calculated as MnO) |
| Cobalt oxide | 0–0.0003% |
| | (calculated as CoO). |

Furthermore, it is more preferable that the ultraviolet ray-absorbing, colorless and transparent soda-lime-silica glass of the present invention comprises, in % by weight,

| | |
|---|---|
| $SiO_2$ | 65–75% |
| $Al_2O_3$ | 0–5% |
| CaO | 6–15% |
| MgO | 0–4% |
| $Na_2O$ | 10–17% |
| $K_2O$ | 0–4% |
| $SO_3$ | 0.15–0.35% |
| Cerium oxide | 0.10–0.65% |
| | (calculated as $CeO_2$) |
| $Fe_2O_3$ | 0.015–0.06% |
| FeO | 0–0.006% |
| Manganese oxide | 0.007–0.06% |
| | (calculated as MnO) |
| Cobalt oxide | 0–0.0003% |
| | (calculated as CoO). |

Furthermore, it is still more preferable that the ultraviolet ray-absorbing, colorless and transparent soda-lime-silica glass of the present invention is characterized in that its composition includes, in % by weight,

| | |
|---|---|
| $SO_3$ | 0.15–0.35% |
| Cerium oxide | 0.12–0.19% |
| | (calculated as $CeO_2$) |
| $Fe_2O_3$ | 0.02–0.04% |
| FeO | 0–0.004% |
| Manganese oxide | 0.007–0.06% |
| | (calculated as MnO) |
| Cobalt oxide | 0–0.0003% |
| | (calculated as CoO). |

On a transmittance curve produced by measuring a 3.5-mm thick sample, the ultraviolet ray-absorbing, colorless and transparent soda-lime-silica glass of the present invention preferably has transmittance of not more than 2.5% at the wavelength of 330 nm and, in the visible region of 420–780 nm, transmittance of not less than 87% without having absorption at any particular wavelength.

In addition, the ultraviolet ray-absorbing, colorless and transparent soda-lime-silica glass of the present invention preferably has dominant wavelength ($\lambda_d$) at 565–575 nm.

The ultraviolet ray-absorbing, colorless and transparent soda-lime-silica glass of the present invention has an excellent ability to absorb ultraviolet ray, in particular ultraviolet ray having wavelengths of 300–350 nm. Therefore, when used in the form of glass bottles, it can prevent light-induced coloration, discoloration, fading in color or deterioration of the flavor of the contents, and is highly effective, inter alia, for prevention not only of a yellowing in color and deterioration of the flavor of refined "sake", which is sensitive to ultraviolet ray at wavelengths around 330 nm, but also of coloration, fading in color or deterioration of the flavor of wines.

Figure 1:
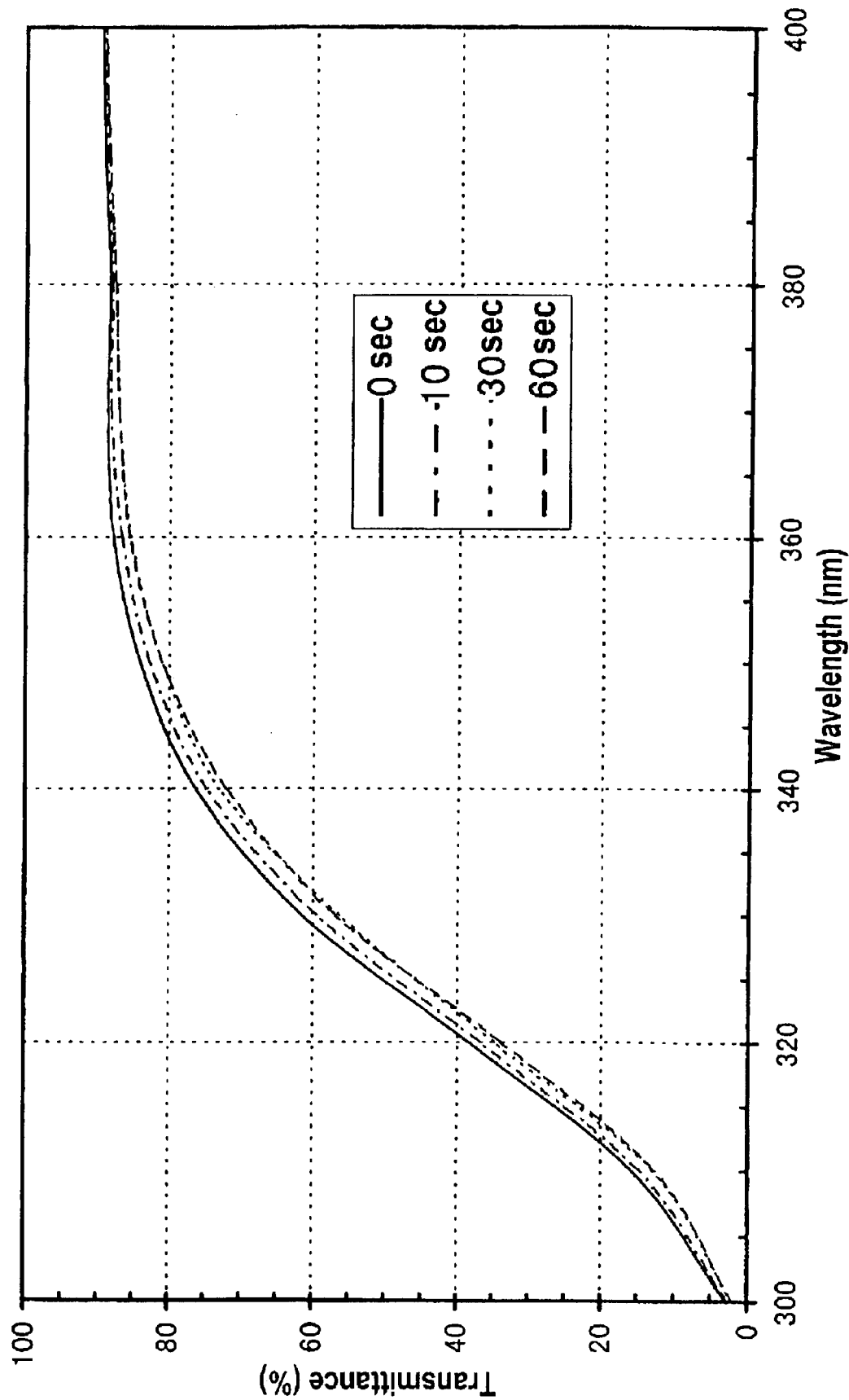
FIG. 1 is a graph illustrating the transmittance curves of the glasses of Comparative Example 1 in the wavelength range of 300–400 nm.

BEST MODE FOR CARRYING OUT THE INVENTION $SiO_2$, which is a glass network-former, is generally contained preferably in a proportion of 65–75% by weight. This is because a $SiO_2$ content below 65% by weight might reduce chemical durability of the glass and, on the other hand, a $SiO_2$ content over 75% by weight might render the glass prone to devitrification. Considering chemical durability and proneness to devitrification of the glass, it is more preferable that the $SiO_2$ is contained in a proportion of 68–74% by weight.

$Al_2O_3$, which is an intermediate oxide of glass, serves to enhance chemical durability of the glass. It is not essential that $Al_2O_3$ be contained. When it is contained, however, it is generally preferable that $Al_2O_3$ content is not more than 5% by weight. This is because an $Al_2O_3$ content over 5% by weight might render the glass difficult to melt. Considering chemical durability and ease of melting of the glass, it is more preferable that $Al_2O_3$ is contained in a proportion of 1–4% by weight.

CaO, which is a glass network-modifier, serves to enhance chemical durability of the glass as well as to improve its easiness of melting. CaO is generally contained preferably in a proportion of 6–15% by weight. This is because a CaO content below 6% by weight might lead to insufficient chemical durability, and a CaO content over 15% by weight, in turn, might render the glass prone to devitrification. Considering chemical durability, proper ease of melting and proneness to devitrification of the glass, CaO is contained more preferably in a proportion of 8–13% by weight.

MgO, which is a glass network-modifier, serves, like CaO, to enhance chemical durability of the glass as well as to improve ease of melting. It is not essential that MgO be contained. When it is contained, however, it is generally preferable that MgO content is not more than 4% by weight. This is because a MgO content over 4% by weight might render the glass prone to devitrification. Considering chemical durability, ease of melting and proneness to devitrification of the glass, it is more preferable that MgO is contained in a proportion of 0.1–3% by weight.

$Na_2O$, which is a glass network-modifier, has an effect to promote melting of raw materials. $Na_2O$ is generally contained preferably in a proportion of 10–17% by weight. This is because a $Na_2O$ content below 10% by weight renders the glass difficult to melt, and, a $Na_2O$ content over 17% by weight might, in turn, reduce the chemical durability of the glass. Considering ease of melting and the chemical durability of the glass, it is more preferable that the $Na_2O$ is contained in a proportion of 11–15% by weight.

$K_2O$, which is a glass network-modifier, serves, like $Na_2O$, to promote melting of raw materials. It is not essential that $K_2O$ be contained. When it is contained, however, it is generally preferable that $K_2O$ content is not more than 4% by weight. This is because a $K_2O$ content over 4% by weight renders the glass prone to devitrification. Considering ease of melting and proneness to devitrification of the glass, it is more preferable that $K_2O$ is contained in a proportion of 0.1–3% by weight.

$SO_3$ may be a residual component of the glass resulting from the fining agents that were added to the batch in the form of a combination of salt cake (sodium sulfate) and carbon. The amounts of salt cake, carbon and other oxidizing and reducing agents that govern the redox state of the batch may be determined so that the content of $SO_3$ will fall within the range of 0.14–0.37% by weight. The lower limit of 0.14% by weight is set because a lower content of $SO_3$ in the glass would render the glass too reductive, which then would increase the ratio of FeO to $Fe_2O_3$ while decreasing the ratio of $Mn_2O_3$ to MnO, even after desired amounts of cerium oxide and manganese oxide were added, thus causing to give the glass a greenish to bluish tint. The upper limit of 0.37% by weight is set because a higher content of $SO_3$ in the glass might cause seed in the glass. Considering prevention of pale greenish to pale bluish coloration of the glass and removal of seed, it is more preferable that the content of $SO_3$ in the glass is regulated to fall within the range of 0.15–0.35% by weight.

Cerium oxide serves as an absorbent of ultraviolet ray and is contained in the forms of $CeO_2$ and $Ce_2O_3$ in the glass of the present invention. Although the mutual proportion between $CeO_2$ and $Ce_2O_3$ varies depending on the content of $SO_3$ and therefore is not clear, they, collectively, are contained preferably at 0.08–0.8% by weight (calculated as $CeO_2$). This is because a content of cerium oxide below 0.08% by weight might provide a glass with only insufficient effect to absorb ultraviolet ray even after irradiation with light having wavelengths in the far- to near-ultraviolet region. The upper limit of 0.8% by weight is preferable because the effect of irradiation with light having wavelengths in the far- to near-ultraviolet region would be made relatively smaller where cerium oxide is contained over 0.8% by weight, and, moreover, the glass would acquire an fluorescent color when the content of cerium oxide is coming close to 1% by weight. Considering the ultraviolet ray-absorbing effect of the glass obtained, the efficiency of production process, economical efficiency, and prevention of emergence of fluorescence, it is more preferable that the cerium oxide is contained in a proportion of 0.10–0.65% by weight (calculated as $CeO_2$). Furthermore, if a glass being produced has high specific gravity, then part of the glass melt containing the higher amount of $ZrO_2$ leaching from bricks of the tank furnace, i.e., the part having the higher specific gravity and usually stagnating on the bottom of the tank furnace, is likely to be brought upward and get unevenly mixed in the product, thereby creating striae in the glass. In order to ensure that such a defect in appearance caused by the addition of high specific gravity cerium oxide is prevented, as well as considering an ultraviolet ray-absorbing effect of the glass, recycling efficiency of flint glass which is generally used as cullet, and economic efficiency, cerium oxide is more preferably contained in a proportion of 0.12–0.19% by weight (calculated as $CeO_2$).

$Fe_2O_3$, like cerium oxide, has an ultraviolet ray-absorbing effect. However, $Fe_2O_3$ can effectively absorb ultraviolet ray around 330 nm, which cerium oxide by itself is unable to absorb sufficiently. Ultraviolet ray at this wavelength is most relevant to the deterioration of the quality of refined "sake". $Fe_2O_3$ is contained preferably in a proportion of 0.01–0.08% by weight. This is because a $Fe_2O_3$ content below 0.01% by weight might provide the above effect only insufficiently, and, on the other hand, a $Fe_2O_3$ content over 0.08% by weight might make it difficult for $Mn^{3+}$ ion to decolorize yellow-green coloration caused by $Fe^{3+}$ ion. Considering desirable absorption of ultraviolet ray by the glass, in particular ultraviolet ray around 330 nm, and prevention of coloration, it is more preferable that of $Fe_2O_3$ is contained in a proportion of 0.015–0.06% by weight, and still more preferable in a proportion of 0.02–0.04% by weight.

FeO is a component which is inevitably produced during the glass melting process from contaminant iron in silica sand in the glass batch, or from iron added as $Fe_2O_3$ to the batch. FeO is not only an unnecessary component for obtaining the ultraviolet ray-absorbing, colorless and transparent soda-lime-silica glass of the present invention, but its content must be not more than 0.008% by weight. This is because a FeO content over 0.008% by weight might give the glass a bluish tint. In order to constantly obtain colorless and transparent glass without fail, the content of FeO is more preferably not more than 0.006% by weight, and still more preferably not more than 0.004% by weight.

Manganese oxide is a component for decolorizing the yellow-green coloration caused by $Fe_2O_3$ contained as an ultraviolet ray absorbent. It, however, is not an indispensable component, and is contained preferably at 0–0.07% by weight in accordance with the dose of irradiation by light having wavelengths in the far- to near-ultraviolet region, the above described contents of $SO_3$, cerium oxide, $Fe_2O_3$ and FeO. Although manganese oxide is present in the glass both as MnO and $Mn_2O_3$, at unknown mutual ratio, it is $Mn^{3+}$ ion that has a decolorizing effect. The above-described content of manganese oxide is the sum of MnO and $Mn_2O_3$ (calculated as MnO). A total content of manganese oxide over 0.07% by weight might lead to red-purple coloration due to the excessive amount of $Mn^{3+}$ ion, which cannot be fully decolorized even by means of cobalt oxide added as mentioned below or, even if it is successfully decolorized, might reduce the brightness of the glass, thereby impairing its transparent appearance. Though manganese oxide, as mentioned above, is not indispensable depending on either the dose of irradiation of light having the above-mentioned wavelengths or composition of the glass, it is preferable that manganese oxide is contained in a proportion of not less than 0.005% by weight (calculated as MnO) to increase the stability of production. Considering decolorizing effect and the stability of production, it is more preferable that manganese oxide is contained in a proportion of 0.007–0.06% by weight.

Cobalt oxide has an effect to decolorize red-purple coloration due to $Mn^{3+}$ ion. Addition of cobalt oxide is not essential. Where somewhat excess amount of $Mn^{3+}$ ion is present, cobalt oxide may be added as needed at or below 0.0005% by weight (calculated as CoO) in order to decolorize the red-purple coloration due to the $Mn^{3+}$ ion. A total content of cobalt oxide over 0.0005% by weight might reduce the brightness of the glass and impair its transparent appearance. Considering the transparent appearance of the glass, it is more preferable that the total content of cobalt oxide is not more than 0.0003% by weight (calculated as CoO).

By irradiating a glass having a composition within the above described ranges with light having wavelengths in the far- to near-ultraviolet region, it has become possible to obtain an ultraviolet ray-absorbing, colorless and transparent soda-lime-silica glass which, on a transmittance curve produced by measuring a 3.5-mm thick sample, has transmittance of not more than 2.5% at the wavelength of 330 nm and, in the visible region of 420–780 nm, transmittance of not less than 87% without having absorption at any particular wavelength. Having transmittance of not more than 2.5% at the wavelength of 330 nm is particularly effective in preventing a yellowing in color and deterioration of the flavor of refined "sake". More preferably, transmittance at the wavelength of 330 nm is not more than 2%. For protection of a variety of contents, transmittance at the wavelength of 350 nm is more preferably not more than 30%, ant still more preferably not more than 25%.

It is preferable that the dominant wavelength ($\lambda_d$) of the glass of the present invention is 565–575 nm. This is because this type of glass, which has no absorption at any particular wavelength in the visible region, would have a bluish tint when its dominant wavelength ($\lambda_d$) is below 565 nm, and a reddish tint when it is over 575 nm. To be completely colorless, the dominant wavelength ($\lambda_d$) of the glass of the present invention is more preferably 567–573 nm.

A general method of producing the glass and glass bottles of the present invention is as follows. Briefly, to 100 parts by weight of silica sand are added 25–36 parts by weight of soda ash, 23–33 parts by weight of limestone, 0.03–0.15 part by weight of carbon (85% by weight of purity), 0.7–2.0 parts by weight of salt cake (sodium sulfate), 0.1–1.1 parts by weight of cerium oxide (as $CeO_2$) and 0–0.08 part by weight of iron oxide (added in the form of $Fe_2O_3$ when the amount of contaminant iron in the silica sand is insufficient), the last two of which, i.e., cerium oxide and iron oxide, serve as ultraviolet ray absorbents, and 0–0.12 part by weight of manganese oxide (as $MnO_2$ of 80% by weight of purity) and 0–0.0007 part by weight of cobalt oxide (as $Co_3O_4$), the last two of which, i.e., manganese oxide and cobalt oxide, serve as decolorizing agents, and thus prepared batch composition is melted at 1400–1500° C., then adjusted to 1200–1350° C. in a working end, passed through a feeder and then into a molding machine, where the glass is formed into bottles at a temperature range of 700–1000° C. Formed bottles are introduced into an annealing lehr so that strain is removed at 500–600° C., cooled over 30 min to 2 hrs to ambient temperature, and irradiated with the far- to near-ultraviolet ray to provide the final products.

Although soda-lime-silica glass usually includes as a component several % by weight of $Al_2O_3$, additional raw materials such as alumina, aluminium hydroxide and feldspar may be further added to adjust the composition if the amount of the contaminant alumina component in the silica sand is insufficient.

Where cullet is employed, blending proportions of the batch may be modified in accordance with the amounts of $SO_3$, cerium oxide, iron oxide, manganese oxide and cobalt oxide contained in the cullet.

EXAMPLES

The present invention is described in further detail below with reference to a comparative example and examples. However, it is not intended that the present invention be limited to those examples.

In the comparative example and the examples, brightness (Y), dominant wavelength ($\lambda_d$), excitation purity (Pe) were calculated by the CIE method provided in JIS Z 8701 based on transmittance curves produced by measuring 3.5-mm thick, mirror-polished samples on a spectrophotometer [U-3410, manufactured by HITACHI, LTD.] and converting the values into those corresponding to 10-mm thick samples.

Compositional analysis of the glass was made on a X-ray fluorescence analyzer (3070: manufactured by RIGAKU). The ratio of $Fe_2O_3$ to FeO was calculated based on the absorbance measured at the wavelength of 1000 nm on the spectrophotometer.

Comparative Example

A batch composition was prepared by weighing and mixing the following components.

| | |
|---|---|
| Kemerton silica sand | 100 parts by weight |
| Soda ash | 27.5 parts by weight |
| Limestone | 27.5 parts by weight |
| Salt cake (sodium sulfate) | 1.4 parts by weight |
| Carbon (85% by weight of purity) | 0.06 part by weight |
| Se | 0.002 part by weight |
| $Co_3O_4$ | 0.00015 part by weight |

The batch composition thus provided was introduced into a continuous tank furnace having a melting capacity of 150 t/day and melted at a glass melting temperature of 1450° C. for 38 hours, then passed through a feeder at 1270° C., molded and passed along a line equipped with a conventional annealing lehr to give bottles having a capacity of 300 mL.

Compositional analysis of this glass by X-ray fluorescence spectrometry (by spectrophotometry with regard to the proportion between $Fe_2O_3$ and FeO) gave the following proportions (% by weight) of components of the composition.

| | |
|---|---|
| $SiO_2$ | 71% |
| $Al_2O_3$ | 2% |
| CaO | 11.3% |
| MgO | 0.15% |
| $Na_2O$ | 12.5% |
| $K_2O$ | 1.4% |
| $SO_3$ | 0.225% |
| $Fe_2O_3$ | 0.025% |
| FeO | 0.0080% |
| Se | 0.00005% |
| Cobalt oxide | 0.00012% |
| | (calculated as CoO) |

Four of the bottles obtained above were taken at random. One of them was set aside as a control glass bottle and the other three were irradiated with light emitted from an 80 W/cm high-pressure mercury arc lamp (HHL-4000/C-FS, OAK SEISAKUSHO KK) for 10, 30 or 60 seconds, respectively. Dose of irradiation of light within the wavelength range of 320–390 nm was simultaneously measured with a low-profile ultraviolet illuminometer/actinometer (Model UV-351, OAK SEISAKUSHO KK). The doses of irradiation with ultraviolet ray were 4.8 J/cm², 14.4 J/cm² and 28.8 J/cm², respectively.

3.5-mm thick samples for measurement were cut out of the control and irradiated glass bottles, mirror-polished and measured to produce transmittance curves on the spectrophotometer. The transmittance curves thus obtained are shown in FIG. 1 in the wavelength range of 300–400 nm. The control glass bottle had brightness (Y) of 85.8%, dominant wavelength ($\lambda_d$) of 572.1 nm, and excitation purity (Pe) of 1.01% and thus was colorless and transparent. However, its transmittance to light at the wavelength of either 350 nm or 330 nm was no less than 84.2% or 61.6%, respectively, indicating it hardly provides shielding against light at those wavelengths. As to the other bottles, which had the same composition as the control bottle and had been irradiated for 10, 30 or 60 seconds, the transmittance to ultraviolet ray showed only a slightest decrease and was still kept at high levels, indicating that the irradiation provided no substantial improvement in shielding effect against light at those wavelengths.

Example 1

A batch composition was prepared by weighing and mixing the following components.

| | |
|---|---|
| Kemerton silica sand | 100 parts by weight |
| Soda ash | 27.5 parts by weight |
| Limestone | 27.5 parts by weight |
| Salt cake (sodium sulfate) | 1.4 parts by weight |
| Carbon (85% by weight of purity) | 0.06 part by weight |
| $CeO_2$ | 0.12 part by weight |
| $MnO_2$ (80% by weight of purity) | 0.035 part by weight |
| $Co_3O_4$ | 0.00015 part by weight |

The batch composition thus provided was introduced into a continuous tank furnace having a melting capacity of 150 t/day and melted at a glass melting temperature of 1450° C. for 38 hours, then passed through a feeder at 1270° C., molded and passed along a line equipped with a conventional annealing lehr to give bottles having a capacity of 300 mL.

Compositional analysis of this glass by X-ray fluorescence spectrometry (by spectrophotometry with regard to the proportion between $Fe_2O_3$ and FeO) gave the following proportions (% by weight) of components of the composition.

| | |
|---|---|
| $SiO_2$ | 71% |
| $Al_2O_3$ | 2% |
| CaO | 11.3% |
| MgO | 0.15% |
| $Na_2O$ | 12.5% |
| $K_2O$ | 1.4% |
| $SO_3$ | 0.258% |
| Cerium oxide | 0.09% |
| | (calculated as $CeO_2$) |
| $Fe_2O_3$ | 0.028% |
| FeO | 0.0050% |
| Manganese oxide | 0.021% |
| | (calculated as MnO) |
| Cobalt oxide | 0.00012% |
| | (calculated as CoO) |

Four of the bottles obtained above were taken at random. As done in Comparative Example, one of them was set aside as a control glass bottle and the other three were irradiated with light emitted from an 80 W/cm high-pressure mercury arc lamp (HHL-4000/C-FS, OAK SEISAKUSHO KK) for 10, 30 or 60 seconds, respectively. Dose of irradiation of light within the wavelength range of 320–390 nm was simultaneously measured with a low-profile ultraviolet illuminometer/actinometer (Model UV-351, OAK SEISAKUSHO KK). The doses of irradiation with ultraviolet ray were 4.8 J/cm², 14.4 J/cm² and 28.8 J/cm², respectively.

Figure 2:
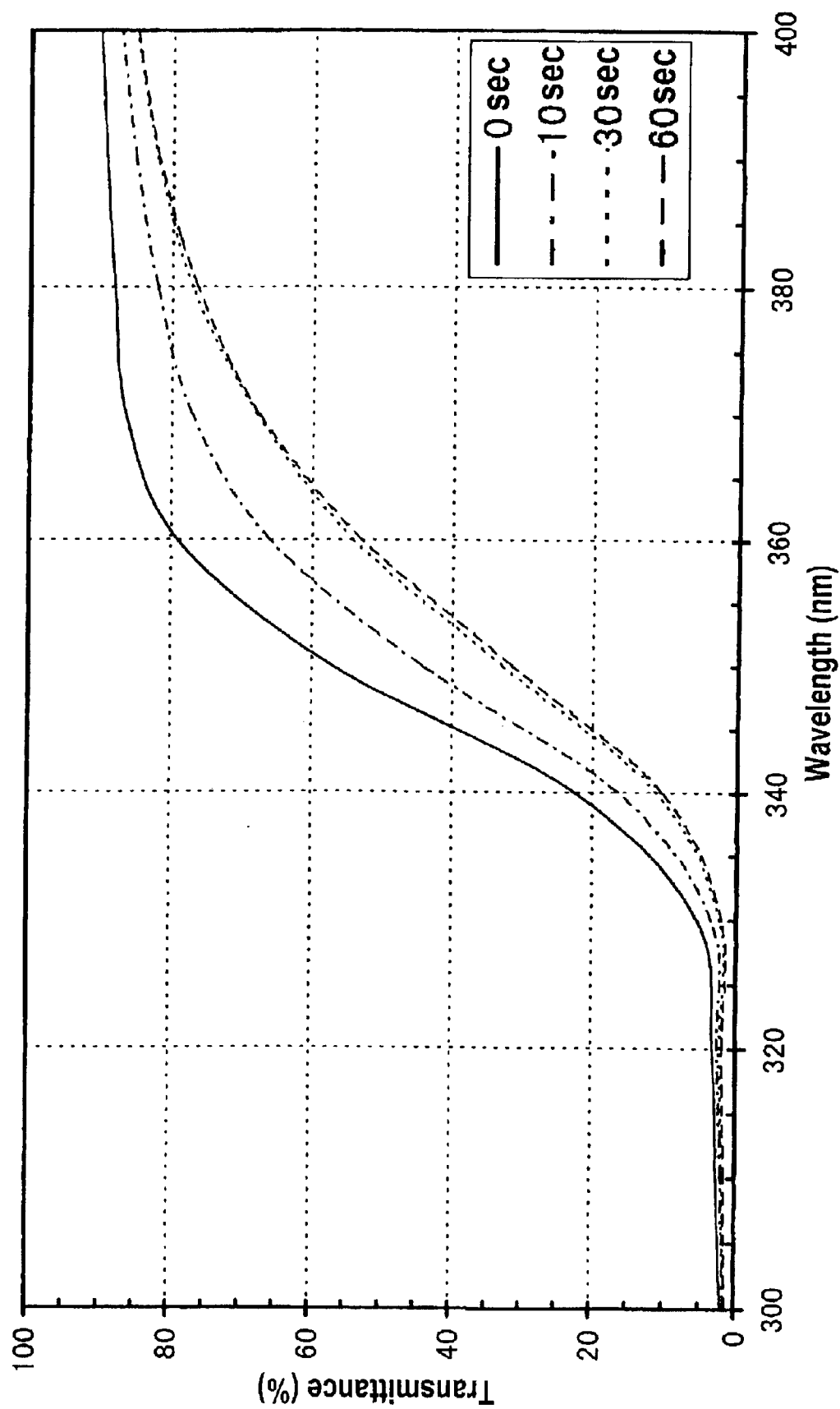
FIG. 2 is a graph illustrating the transmittance curves of the glasses of Example 1 in the wavelength range of 300–400 nm.
Figure 3:
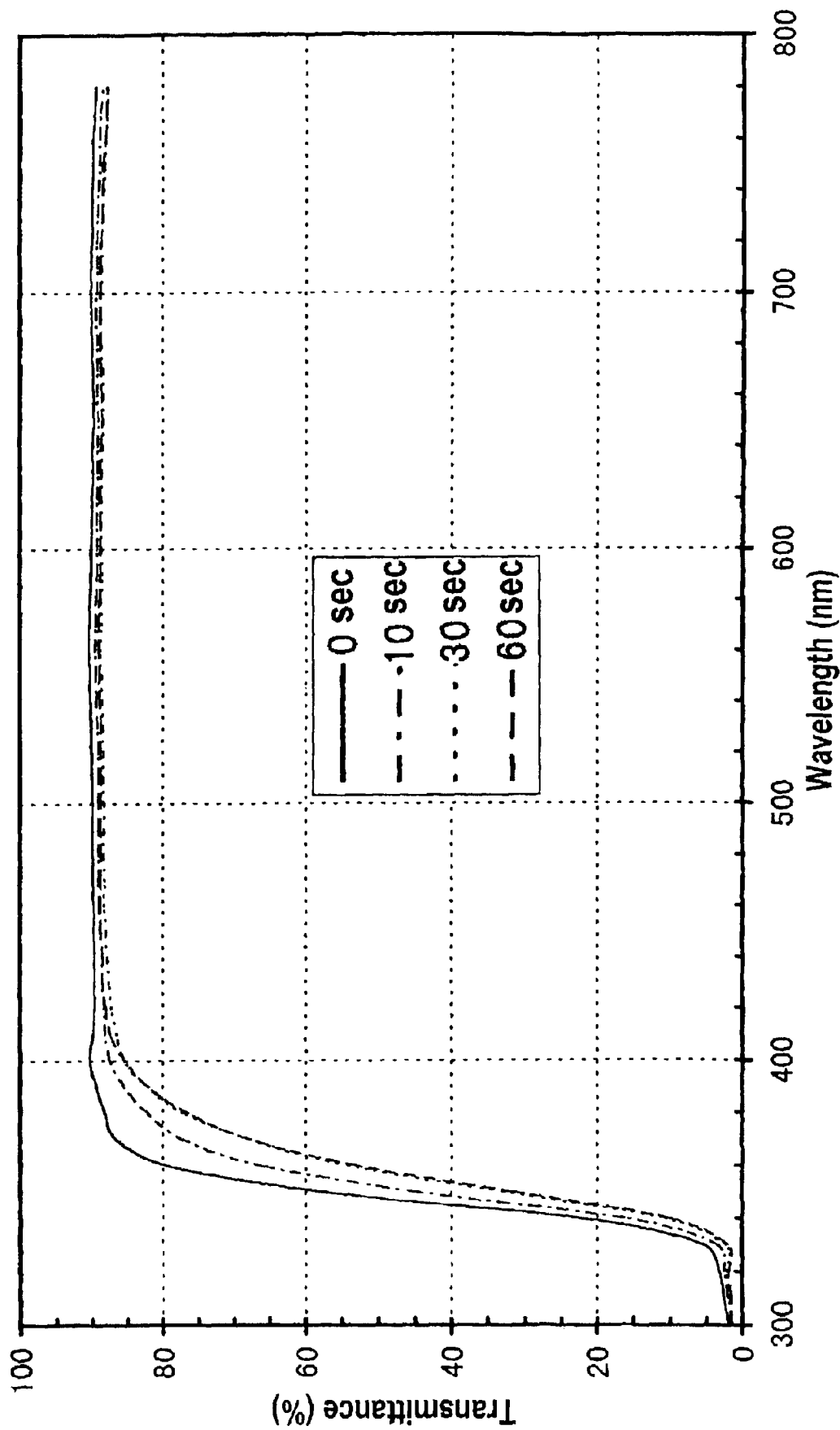
FIG. 3 is a graph illustrating the transmittance curves of the glasses of Example 1 in the wavelength range of 300–780 nm.

3.5-mm thick samples for measurement were cut out of the control and irradiated glass bottles, mirror-polished and measured to produce transmittance curves on the spectrophotometer. The results are shown in FIG. 2 (300–400 nm) and FIG. 3 (300–780 nm). The control glass bottle (0-second irradiation) had brightness (Y) of 86.6%, dominant wavelength ($\lambda_d$) of 566.7 nm, and excitation purity (Pe) of 0.64%. Its transmittance to light at the wavelengths of either 350 nm or 330 nm was 57.2% or 5.5%, respectively (FIG. 2). In addition, in the visible region of 420–780 nm, its transmittance was not less than 87% without any apparent rise or fall in absorption at a particular wavelength (FIG. 3). Thus, this control glass bottle of this Example is colorless and transparent, and has significantly reduced transmittance to ultraviolet ray compared with the glass bottles of Comparative Example above. Furthermore, the other bottles, which had the same composition as the control bottle and had been irradiated for 10, 30 or 60 seconds, exhibited further reduction in transmittance to ultraviolet ray (FIG. 2 and Table 2) as compared with the control bottle. More specifically, while the transmittance of the control glass bottle was 57.2% to light at the wavelength of 350 nm, those of the bottles irradiated for 10, 30 or 60 seconds were further reduced to 44.4%, 32.9% or 31.5%, respectively. Furthermore, the transmittance to light at the wavelength of 330 nm, which was 5.5% for the control glass bottle, was further reduced to 3.5%, 2.3% or 2.1% for the bottles irradiated for 10, 30 or 60 seconds, respectively (FIG. 2 and Table 2). On the other hand, the irradiation did not substantially affect on brightness (Y), dominant wavelength ($\lambda_d$), excitation purity (Pe) or the form of transmittance curve in the visible region of 420–780 nm (FIG. 3 and Table 2), and thus the colorless and transparent feature of the bottles remained intact. These results indicate that irradiation of the glass of the composition of Example 1 with light having wavelengths in the far- to near ultraviolet region provides colorless and transparent glass having still further increased ability of absorbing ultraviolet ray.

Examples 2–6

According to the blending proportions of batches shown in Table 1, glass bottles of Examples 2–6 were produced in the same manner as in Comparative Example and Example 1. The bottles were irradiated for 0, 10, 30 or 60 seconds in the same matter as described above, and 3.5-mm thick samples were prepared and their color values and transmittance were measured.

For each of the the glass, as well as for the glass of Comparative Example and Example 1, the blending proportion of batches and glass composition are shown collectively in Table 1, and color values and transmittance to light in Table 2, respectively.

TABLE 1

| | | Comparative Example | Example 1 | Example 2 | Example 3 | Example 4 | Example 5 | Example 6 |
|---|---|---|---|---|---|---|---|---|
| Batch blending proportion (part(s) by weight) | Kemerton silica sand | 100 | 100 | 100 | 100 | 100 | 100 | 100 |
| | Soda ash | 27.5 | 27.5 | 27.5 | 27.5 | 27.5 | 27.5 | 27.5 |
| | Limestone | 27.5 | 27.5 | 27.5 | 27.5 | 27.5 | 27.5 | 27.5 |
| | Salt cake | 1.4 | 1.4 | 1.4 | 1.4 | 1.4 | 1.4 | 1.4 |
| | Carbon (85%) | 0.06 | 0.06 | 0.06 | 0.06 | 0.06 | 0.06 | 0.06 |
| | $CeO_2$ | 0 | 0.12 | 0.23 | 0.33 | 0.64 | 0.81 | 1.03 |
| | $MnO_2$ (80%) | 0 | 0.035 | 0.089 | 0.094 | 0.059 | 0.054 | 0 |
| | Se | 0.002 | 0 | 0 | 0 | 0 | 0 | 0 |
| | $Co_3O_4$ | $1.5 \times 10^{-4}$ | $1.5 \times 10^{-4}$ | $1.5 \times 10^{-4}$ | $1.5 \times 10^{-4}$ | $1.5 \times 10^{-4}$ | $1.5 \times 10^{-4}$ | 0 |
| Glass composition (% by weight) | $SiO_2$ | 71 | 71 | 71 | 71 | 71 | 71 | 71 |
| | $Al_2O_3$ | 2 | 2 | 2 | 2 | 2 | 2 | 2 |
| | CaO | 11.3 | 11.3 | 11.3 | 11.3 | 11.3 | 11.3 | 11.3 |
| | MgO | 0.15 | 0.15 | 0.15 | 0.15 | 0.15 | 0.15 | 0.15 |
| | $Na_2O$ | 12.5 | 12.5 | 12.5 | 12.5 | 12.5 | 12.5 | 12.5 |
| | $K_2O$ | 1.4 | 1.4 | 1.4 | 1.4 | 1.4 | 1.4 | 1.4 |
| | $SO_3$ | 0.225 | 0.258 | 0.266 | 0.265 | 0.285 | 0.286 | 0.287 |
| | Cerium oxide (calculated as $CeO_2$) | 0 | 0.09 | 0.17 | 0.25 | 0.48 | 0.61 | 0.77 |
| | $Fe_2O_3$ | 0.025 | 0.028 | 0.034 | 0.035 | 0.032 | 0.033 | 0.032 |
| | FeO | 0.0080 | 0.0050 | 0.0022 | 0.0014 | 0.0007 | 0.0003 | 0.0003 |
| | Manganese oxide (calculated as MnO) | 0 | 0.021 | 0.054 | 0.057 | 0.036 | 0.033 | 0 |
| | Se | $5 \times 10^{-5}$ | 0 | 0 | 0 | 0 | 0 | 0 |
| | Cobalt oxide (calculated as CoO) | $1.2 \times 10^{-4}$ | $1.2 \times 10^{-4}$ | $1.2 \times 10^{-4}$ | $1.2 \times 10^{-4}$ | $1.2 \times 10^{-4}$ | $1.2 \times 10^{-4}$ | 0 |

TABLE 2

| | Irradiation (sec) | Comparative Example | Example 1 | Example 2 | Example 3 | Example 4 | Example 5 | Example 6 |
|---|---|---|---|---|---|---|---|---|
| Color values | | | | | | | | |
| Y (%) | 0 | 85.8 | 86.6 | 87.2 | 87.4 | 87.0 | 87.1 | 88.9 |
| | 10 | 85.3 | 84.3 | 85.8 | 83.6 | 84.7 | 86.3 | 87.8 |
| | 30 | 84.7 | 79.6 | 84.7 | 82.6 | 80.6 | 85.7 | 87.4 |
| | 60 | 85.1 | 82.1 | 83.4 | 83.7 | 83.7 | 84.5 | 86.7 |
| $\lambda_d$ (nm) | 0 | 572.1 | 566.7 | 566.4 | 566.5 | 572.2 | 573.8 | 573.0 |
| | 10 | 573.1 | 569.2 | 570.0 | 570.5 | 573.0 | 572.9 | 573.0 |
| | 30 | 575.2 | 572.4 | 573.1 | 573.6 | 574.3 | 572.9 | 573.3 |
| | 60 | 575.4 | 570.5 | 573.8 | 574.1 | 572.3 | 575.4 | 573.1 |

TABLE 2-continued

|  | Irradiation (sec) | Comparative Example | Example 1 | Example 2 | Example 3 | Example 4 | Example 5 | Example 6 |
|---|---|---|---|---|---|---|---|---|
| Pe (%) | 0 | 1.01 | 0.64 | 0.61 | 0.63 | 0.75 | 0.92 | 1.50 |
|  | 10 | 1.10 | 0.85 | 0.82 | 0.80 | 0.94 | 1.07 | 1.67 |
|  | 30 | 1.21 | 1.04 | 0.88 | 0.78 | 1.32 | 0.92 | 1.66 |
|  | 60 | 1.23 | 0.69 | 0.88 | 0.56 | 0.93 | 1.12 | 1.54 |
| Transmittance (%) (330 nm) | 0 | 61.6 | 5.5 | 3.8 | 3.4 | 3.1 | 2.7 | 2.5 |
|  | 10 | 59.5 | 3.5 | 2.9 | 3.0 | 2.6 | 1.8 | 1.7 |
|  | 30 | 56.3 | 2.3 | 2.0 | 1.9 | 1.8 | 1.8 | 1.6 |
|  | 60 | 56.9 | 2.1 | 1.9 | 1.8 | 1.8 | 1.8 | 1.5 |
| Transmittance (%) (350 nm) | 0 | 84.2 | 57.2 | 43.4 | 33.0 | 14.3 | 11.0 | 7.3 |
|  | 10 | 82.8 | 44.4 | 34.0 | 27.7 | 12.7 | 9.4 | 6.0 |
|  | 30 | 81.1 | 32.9 | 31.3 | 22.2 | 10.3 | 9.1 | 5.7 |
|  | 60 | 81.0 | 31.5 | 24.3 | 21.1 | 9.9 | 7.4 | 4.7 |
| Transmittance (%) (420–780 nm) | 0 | ≧87 | ≧87 | ≧87 | ≧87 | ≧87 | ≧87 | ≧87 |
|  | 10 | ≧87 | ≧87 | ≧87 | ≧87 | ≧87 | ≧87 | ≧87 |
|  | 30 | ≧87 | ≧87 | ≧87 | ≧87 | ≧87 | ≧87 | ≧87 |
|  | 60 | ≧87 | ≧87 | ≧87 | ≧87 | ≧87 | ≧87 | ≧87 |

From Table 2, it is evident that irradiation with light with wavelengths in the far- and near-ultraviolet region gives colorless and transparent glass with further reduced transmittance to ultraviolet ray.

INDUSTRIAL APPLICABILITY

The present invention enables to produce ultraviolet ray-absorbing, colorless and transparent soda-lime-silica glass and glass bottles made of the glass which, while having high transmittance to light in the visible region, blocks ultraviolet ray more effectively than before. Therefore, the present invention is applicable to production of glass bottles which can prevent coloration, discoloration, fading in color or deterioration of the flavor of their contents, inter alia, glass bottles which can prevent a yellowing in color of refined "sake" and coloration or fading in color of wines, as well as deterioration of the flavor of refined "sake" and wines.

What is claimed is:

1. An ultraviolet ray-absorbing, colorless and transparent soda-lime-silica glass wherein the glass is prepared by irradiating a cerium containing soda-lime-silica glass with light having wavelengths in the far- to near-ultraviolet region and thereby reducing transmittance to light with wavelengths in the region of 300–400 nm, wherein the reduction in transmittance, measured as transmittance after irradiation/transmittance before irradiation, is ≦0.9 when assessed employing transmittance to light having a wavelength of 350 nm measured with a 3.5-mm thick sample as an index, wherein the glass comprises, in % by weight,

| SO$_3$ | 0.15–0.35% |
| Cerium oxide | 0.12–0.19% |
|  | (calculated as CeO$_2$) |
| Fe$_2$O$_3$ | 0.02–0.04% |
| FeO | 0–0.004% |
| Manganese oxide | 0.007–0.06% |
|  | (calculated as MnO), and |
| Cobalt oxide | 0–0.0003% |
|  | (calculated as CoO). |

2. The ultraviolet ray-absorbing, colorless and transparent soda-lime-silica glass of claim 1 wherein the glass exhibits, on a transmittance curve produced by measuring a 3.5-mm thick sample, transmittance of not more than 2.5% at a wavelength of 330 nm and has, in the visible region of 420–780 nm, transmittance of not less than 87% without having absorption at any particular wavelength.

3. The ultraviolet ray-absorbing, colorless and transparent soda-lime-silica glass of claim 1 wherein the glass has a dominant wavelength ($\lambda_d$) at 565–575 nm.

4. The ultraviolet ray-absorbing, colorless and transparent soda-lime-silica glass of claim 1 wherein the glass is in the form of a glass bottle.

5. A method for producing an ultraviolet ray-absorbing, colorless and transparent soda-lime-silica glass, wherein the method comprises irradiating a cerium-containing soda-lime-silica glass with light having wavelengths in the far- to near-ultraviolet region to cause reduction in transmittance to light with wavelengths in the region of 300–400 nm, wherein the reduction in transmittance, measured as transmittance after irradiation/transmittance before irradiation, is ≦0.9 when assessed employing transmittance to light having a wavelength of 350 nm measured with a 3.5-mm thick sample as an index, wherein the glass produced by the method is characterized in that the composition of the glass includes, in % by weight,

| SO$_3$ | 0.15–0.35% |
| Cerium oxide | 0.12–0.19% |
|  | (calculated as CeO$_2$) |
| Fe$_2$O$_3$ | 0.02–0.04% |
| FeO | 0–0.004% |
| Manganese oxide | 0.007–0.06% |
|  | (calculated as MnO), and |
| Cobalt oxide | 0–0.0003% |
|  | (calculated as CoO). |

6. The method of claim 5, wherein the glass produced by the method comprises, in % by weight,

| SiO$_2$ | 65–75% |
| Al$_2$O$_3$ | 0–5% |
| CaO | 6–15% |
| MgO | 0–4% |
| Na$_2$O | 10–17% |
| K$_2$O | 0–4%. |

* * * * *